US009057309B2

(12) United States Patent
Yezerets et al.

(10) Patent No.: US 9,057,309 B2
(45) Date of Patent: Jun. 16, 2015

(54) SYSTEM AND APPARATUS FOR ENHANCING EXHAUST AFTERTREATMENT STARTUP EMISSIONS CONTROL

(71) Applicant: Cummins Inc., Columbus, IN (US)

(72) Inventors: Aleksey Yezerets, Columbus, IN (US); Zheng Liu, Knoxville, TN (US); Neal W. Currier, Columbus, IN (US); J. Stephen Wills, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/161,153

(22) Filed: Jan. 22, 2014

(65) Prior Publication Data

US 2014/0134054 A1 May 15, 2014

Related U.S. Application Data

(62) Division of application No. 13/045,252, filed on Mar. 10, 2011, now Pat. No. 8,671,666.

(60) Provisional application No. 61/312,887, filed on Mar. 11, 2010.

(51) Int. Cl.
*F01N 3/00* (2006.01)
*F01N 3/20* (2006.01)
*F01N 11/00* (2006.01)

(52) U.S. Cl.
CPC .............. *F01N 3/208* (2013.01); *F01N 11/002* (2013.01); *F01N 2560/06* (2013.01); *F01N 2610/02* (2013.01); *F01N 2610/1453* (2013.01); *F01N 2900/12* (2013.01); *F01N 2900/1602* (2013.01); *Y02T 10/47* (2013.01); *Y02T 10/24* (2013.01)

(58) Field of Classification Search
CPC ... F01N 3/208; F01N 11/002; F01N 2560/06; F01N 2610/02; F01N 2900/12
USPC ............................ 60/274, 286, 295, 301, 303
See application file for complete search history.

(56) References Cited

U.S. PATENT DOCUMENTS 6,266,955 B1 7/2001 Liang et al.
6,311,484 B1 11/2001 Roth et al.
6,415,602 B1 7/2002 Patchett et al.
6,446,430 B1 9/2002 Roth et al.
6,662,553 B2 12/2003 Patchett et al.
6,713,030 B1 3/2004 Chandler et al.
6,742,330 B2 6/2004 Genderen
6,981,368 B2 1/2006 van Nieuwstadt
6,993,900 B2 2/2006 Upadhyay et al.
7,093,427 B2 8/2006 van Nieuwstadt
7,113,835 B2 9/2006 Boyden
7,117,046 B2 10/2006 Boyden
7,150,145 B2 12/2006 Patchett et al.
7,264,785 B2 9/2007 Blakeman et al.
2005/0198943 A1 9/2005 Breuer et al.

FOREIGN PATENT DOCUMENTS

EP 1339955 10/2001

*Primary Examiner* — Jason Shanske
(74) *Attorney, Agent, or Firm* — Krieg DeVault LLP

(57) ABSTRACT

An aftertreatment system including a method which provides a selective catalytic reduction (SCR) catalyst disposed in an exhaust stream of an engine; determines that an ammonia pre-load condition for the SCR catalyst is present; determines a first amount of ammonia pre-load in response to the ammonia pre-load condition; injects an amount of ammonia or urea into the exhaust stream in response to the first amount of ammonia; and adsorbs a second amount of ammonia onto the SCR catalyst in response to injecting an amount of ammonia or urea, where the second amount of ammonia is either the injected amount of ammonia or an amount of ammonia resulting from hydrolysis from the injected amount of urea.

14 Claims, 3 Drawing Sheets

SYSTEM AND APPARATUS FOR ENHANCING EXHAUST AFTERTREATMENT STARTUP EMISSIONS CONTROL

CROSS-REFERENCE TO RELATED APPLICATIONS

This application is a divisional of U.S. patent application Ser. No. 13/045,252 filed on Mar. 10, 2011, which claims the benefit of U.S. Provisional Application No. 61/312,887 filed on Mar. 11, 2010, each of which is incorporated herein by reference for all purposes.

BACKGROUND

The present application generally relates to exhaust aftertreatment systems, and more particularly, but not exclusively, to selective catalytic reduction ("SCR") systems. Presently available SCR systems adsorb ammonia ($NH_3$) on a catalyst and then react the $NH_3$ with $NO_x$ to reduce the $NO_x$ emissions. The $NH_3$ is typically stored as a less reactive composition, e.g. urea, and hydrolyzed into $NH_3$ in the exhaust system as required to reduce the $NO_x$ emitted by the engine. Immediately after an engine startup event, under certain conditions the exhaust system is not warm enough to sufficiently hydrolyze urea. A lag time in the ability to deliver $NH_3$ to the reduction catalyst can increase emissions of the system. If the $NO_x$ reaches the reduction catalyst and no $NH_3$ is available, a higher portion of the $NO_x$ will slip out of the system as increased emissions.

SUMMARY

One embodiment is a unique method for enhancing exhaust aftertreatment $NO_x$ control after engine startup. Further embodiments, forms, objects, features, advantages, aspects, and benefits shall become apparent from the following description and drawings.

DESCRIPTION OF THE ILLUSTRATIVE EMBODIMENTS

Figure 1:
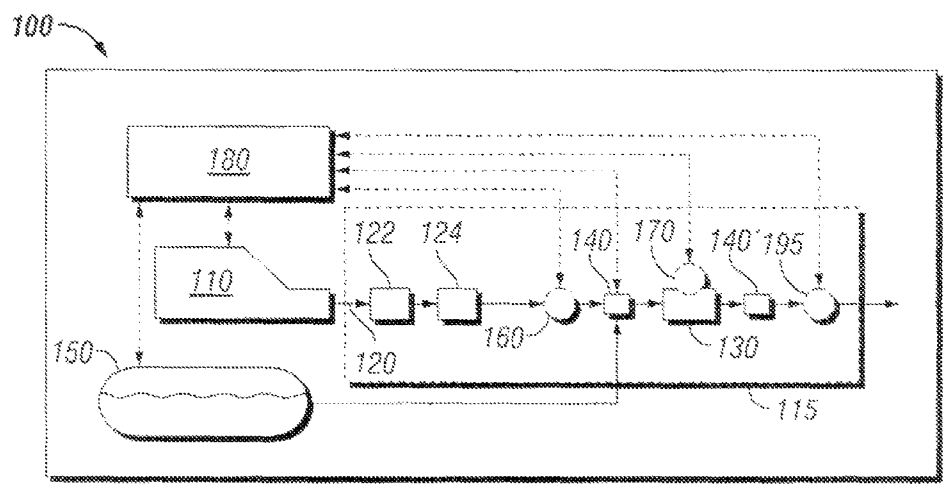
FIG. 1 is a schematic illustration of a system including an exemplary SCR system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1, there is illustrated a system 100 including an engine 110 which is configured to provide rotating mechanical power to system 100 and to output exhaust to an exhaust flow path 120. System 100 is illustrated schematically and may be a car, truck, bus, boat, recreational vehicle, construction equipment, another type of vehicle, or any device powered by an engine 110. Other embodiments include an engine provided in other applications such as a generator set. The exhaust output by engine 110 includes NO which is to be reduced using an exhaust aftertreatment system 115.

In one embodiment, exhaust aftertreatment system 115 may include an oxidation catalyst 122 which is in fluid communication with exhaust flow path 120 and is operable to catalyze oxidation of one or more compounds in exhaust flowing through exhaust flow path 120, for example, oxidation of NO to $NO_2$. In another embodiment, exhaust aftertreatment system 115 may further include a diesel particulate filter 124 which would be in fluid communication with exhaust flow path 120 and would be operable to reduce the level of particulates in exhaust flowing through exhaust flow path 120. In an exemplary embodiment diesel particulate filter 124 is a catalyzed soot filter. Other embodiments utilize other types of diesel particulate filters.

Exhaust aftertreatment system 115 may include a reductant injector 140 and SCR catalyst 130. Reductant injector 140 is supplied with reductant from a reductant reservoir 150 and is operable to inject reductant into exhaust flow path 120. In an exemplary embodiment the reductant is an aqueous solution of urea which decomposes (e.g. by hydrolysis) to provide $NH_3$. Reductant injected into exhaust flow path is provided to SCR catalyst 130 which is in flow communication with exhaust flow path 120 and is operable to catalyze the reduction of $NO_x$.

Exhaust flow path 120, as illustrated schematically in FIG. 1, may be provided in a variety of physical configurations. In an exemplary embodiment an exhaust flow path proceeds from the output of a turbocharger of an engine through a conduit to a structure containing an oxidation catalyst and a diesel particulate filter, through a second conduit to a structure containing an SCR catalyst and through another conduit which outlets to the ambient environment. This embodiment may also include an ammonia oxidation AMOX catalyst (not shown) at a position downstream of the SCR catalyst, which is operable to catalyze the reaction of $NH_3$ which slips past the SCR catalyst.

Figure 2:
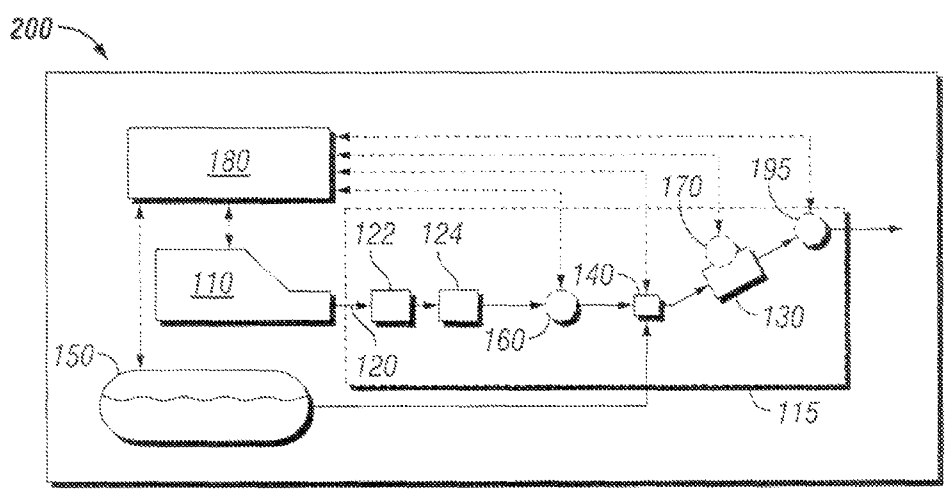
FIG. 2 is a schematic illustration of a system including another exemplary SCR system.

Another embodiment is shown in FIG. 2 where positioning of SCR catalyst 130 in the exhaust stream is at a vertically higher position than reductant injector 140 that performs the injecting. The released $NH_3$ is lighter than the ambient gas (air and/or combustion gases) and the positioning of the SCR catalyst 130 at a position vertically higher than the reductant injector 140 can enhance the speed at which the $NH_3$ diffuses into and adsorbs on the SCR catalyst 130, as well as reduce the $NH_3$ concentration in the vicinity of the injected urea that may remain on the walls of the exhaust flow path 120 and not yet be hydrolyzed. Yet another embodiment shown in FIG. 1 may include positioning the injector 140' downstream of the SCR catalyst, including positioning the injector downstream and at a vertically lower position than the SCR catalyst 130. Other embodiments may omit one or more of the foregoing elements, include additional elements, feature alternate elements, and/or feature different arrangements and configurations of elements as would be determined by one skilled in the art.

In certain embodiments, system 100 includes a controller 180 which functionally executes certain operations for enhancing startup emissions control of the exhaust aftertreatment system 115. Controller 180 forms a portion of a processing subsystem including one or more computing devices having memory as well as a number of inputs and outputs for interfacing with various sensors and devices of system 100. Controller 180 can be an electronic circuit comprised of one or more components, including digital circuitry, analog circuitry, or both. Controller 180 may be a single device or a distributed device. Controller 180 may include one or more control algorithms defined by operating logic in the form of software instructions, hardware instructions, firmware instructions, dedicated hardware, or the like.

In one embodiment, controller 180 is of a programmable microcontroller solid-state integrated circuit device including memory and one or more central processing units. The memory of controller 180 can be comprised of one or more components and can be of any volatile or nonvolatile type, including solid-state, optical media, magnetic media, combinations of these, or other types of memory. Controller 180 can include signal conditioners, signal format converters (such as analog-to-digital and digital-to-analog converters), limiters, clamps, filters, and the like as needed to perform various control and regulation operations described herein. Controller 180, in an exemplary embodiment, may be a type of controller sometimes referred to as an electronic or engine control module (ECM), electronic or engine control unit (ECU) or the like, that is directed to the regulation and control of engine operation. Alternatively, controller 180 may be dedicated to the control of just the operations described herein or to a subset of controlled aspects of system 100.

In certain embodiments, the controller 180 includes one or more modules structured to functionally execute the operations of the controller 180. The description herein including modules emphasizes the structural independence of the aspects of the controller, and illustrates one grouping of operations and responsibilities of the controller 180. Other groupings that execute similar overall operations are understood within the scope of the present application. Modules may be implemented in hardware and/or software on computer readable medium, and modules may be distributed across various hardware or software components.

Controller 180 is in operative interconnection with various elements of system 100 as illustrated in FIG. 1 with dashed lines extending between controller 180 and various elements of system 100. These operative interconnections may be implemented in a variety of forms, for example, through input/output interfaces coupled via wiring harnesses, a datalink, a hardwire or wireless network and/or a lookup from a memory location. In other instances all or a portion of the operative interconnection between controller 180 and an element of system 100 may be virtual. For example, a virtual input indicative of an operating parameter may be provided by a model implemented by controller 180 or by another controller which models an operating parameter based upon other information. The system 100 may include interconnections with the controller 180 that are not shown, and alternatively or additionally some of the illustrated interconnections may not be present.

Controller 180 is in operative communication with temperature sensor 160 which provides controller 180 with information indicative of the temperature of the exhaust flow path 120 in the region of the injector 140. The controller 180 may further be in operative communication with a temperature sensor (not shown) that provides ambient air temperature. Controller 180 is in operative communication with a temperature determiner 170 which provides controller 180 with information indicative of the temperature of SCR catalyst 130. In an exemplary embodiment the temperature determiner 170 provides the information indicative of the temperature of SCR catalyst 130 utilizing temperature sensors (not shown) upstream and/or downstream of the SCR catalyst 130 in combination with a model that uses a weighted average of information from the temperature sensors. In other embodiments, the temperature determiner 170 utilizes any models and/or measured parameters in the system 100 to determine the information indicative of the temperature of SCR catalyst 130.

In another embodiment, controller 180 may be in operative communication with $NO_x$ sensor 195 which provides controller 180 with information indicative of the level of $NO_x$ output from SCR catalyst 130. In an exemplary embodiment $NO_x$ sensor 195 is a physical sensor which is in fluid communication with exhaust flow path 120. Other embodiments may provide information indicative of the level of $NO_x$ output from SCR catalyst 130 utilizing a greater number of sensors, different types of sensors or information available from an engine controller (not shown). In other embodiments, controller 180 may be part of the engine controller or may have a separate component pertaining to a $NO_x$ output sensor.

The controller may also be in operative communication with a virtual $NO_x$ sensor which provides the controller with information indicative of the level of $NO_x$ input to the SCR catalyst using a model based upon operating conditions of the engine, for example, engine load, engine fueling, exhaust temperature and/or other parameters. In other embodiments, an upstream $NO_x$ sensor (not shown) is in fluid communication with exhaust flow path 120 and is located upstream from SCR catalyst 130.

During operation controller 180 uses the information indicative of the level of $NO_x$ provided to SCR catalyst 130 along with information from sensors 160, 170, 195 to determine the amount or rate of reductant to be injected by reductant injector 140. Controller 180 is in operative communication with reductant injector 140 and can command reductant injector 140 to inject a selected amount of reductant or to inject reductant at a selected rate. In an exemplary embodiment controller 180 commands reductant injection that is determined to maximize the catalytic reduction of $NO_x$ by SCR catalyst 130, to maximize $NH_3$ storage by SCR catalyst 130, to reduce $NO_x$ with the SCR catalyst to prescribed levels, to minimize the slip of $NH_3$ past SCR catalyst 130, and/or to ensure slip of $NH_3$ past the AMOX is at acceptable levels. In other embodiments, controller 180 commands reductant injection to differently balance these parameters or to account for additional or different parameters.

Figure 4:
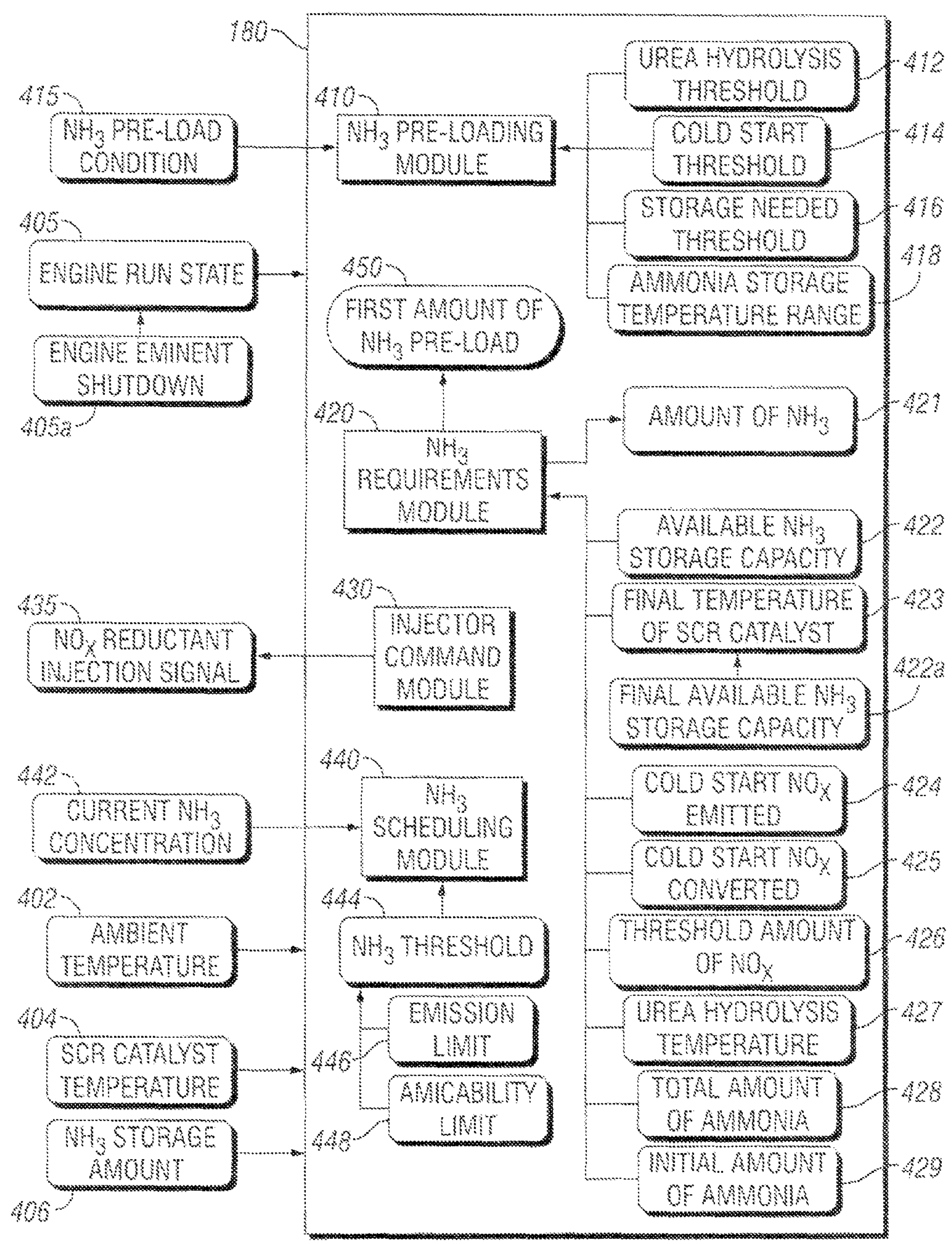
FIG. 4 is a diagram illustrating an exemplary controller for enhancing exhaust aftertreatment startup emissions control.

Referencing FIG. 4, an apparatus includes a controller 180 with various components illustrated as representative modules, inputs, outputs, and intermediate data parameters. Module 410 is an $NH_3$ pre-loading module structured to determine if an $NH_3$ pre-load condition 415 for an SCR catalyst is present. The $NH_3$ pre-loading module 410 may be structured to determine if the $NH_3$ pre-load condition 415 for the SCR catalyst is present using one or more of the following determinations: (1) determining that an ambient temperature 402 is above a urea hydrolysis threshold 412 and therefore injected urea will be sufficiently hydrolyzed; (2) determining that an ambient temperature 402 is below a cold start threshold 414 and therefore suggesting potential for $NO_x$ emission on a subsequent engine start before system temperature is able to achieve urea hydrolysis temperature 427; (3) determining that an $NH_3$ storage amount 406 on the SCR catalyst is below a storage needed threshold 416 and additional $NH_3$ storage is desirable; or (4) determining that a current SCR catalyst temperature 404 is within an $NH_3$ storage temperature range 418 and therefore injected and hydrolyzed urea will result in additional $NH_3$ stored on the SCR catalyst.

Module 420 is an $NH_3$ requirements module 420 structured to determine a first amount of $NH_3$ pre-load 450 in response to the $NH_3$ pre-load condition 415. The $NH_3$ requirements module 420 may be structured to determine a first amount of $NH_3$ pre-load 450 using a quantifying operation such as one of the following: (1) determining a current available $NH_3$ storage capacity 422 of the SCR catalyst at a current SCR catalyst temperature 404; (2) modeling a final temperature of the SCR catalyst 423 that will be present after an amount of injected urea hydrolyzes into $NH_3$ and then determining a final available storage capacity 422*a* of the SCR catalyst that will be available at the final temperature of the SCR catalyst 423; (3) determining an amount of $NH_3$ 421 selected such that if the engine is cold soaked to a current ambient temperature 402, a cold start $NO_x$ converted 425 (i.e. the amount of $NO_x$ converted by the amount of $NH_3$ 421 in a subsequent cold start event until a urea hydrolysis temperature 427 is reached) will be great enough such that a cold start $NO_x$ emitted 425 (the incremental amount of $NO_x$ emitted due to the cold start event) is less than a threshold amount of $NO_x$ 426 during the subsequent cold start event; or (4) determining an amount of $NH_3$ 421 selected such that determining an amount of $NH_3$ 421 selected such that if the engine is cold soaked to a current ambient temperature 402, the amount of $NO_x$ converted by a total amount of $NH_3$ 428 on the SCR catalyst (i.e. including the amount of $NH_3$ 421 added to an initial amount of $NH_3$ 429) in a subsequent cold start event will be great enough such that a cold start $NO_x$ emitted 425 (the incremental amount of $NO_x$ emitted due to the cold start event) is less than the threshold amount of $NO_x$ 426 during the subsequent cold start event.

The $NH_3$ requirements module 420 may be further structured to determine the first amount of $NH_3$ pre-load 450 using an iterative operation which updates the first amount of $NH_3$ pre-load 450 in response to the $NH_3$ pre-load condition 415 followed by subsequent determinations of an amount of $NH_3$ 421 in response to subsequent conditions. For example, and without limitation, a change in the ambient temperature 402 may change the amount of $NH_3$ 421 desired to achieve the target cold start $NO_x$ emitted 425. The described adjustments are exemplary, and any other adjustments to updating conditions are contemplated herein. Module 420 may use any combination of determinations for pre-load conditions or quantifying operations for determining a first amount of $NH_3$ pre-load 450 during the iterations. The iterative determination of the first amount of NH3 pre-load 450, in addition to incremental addition of the amount of NH3 421 instead of injecting the entire amount of NH3 421 at once, allows for adjustments in the $NH_3$ pre-load condition on the SCR catalyst in response to situations such as a premature engine start or ambient temperature changes, thereby limiting the presence of un-adsorbed NH3 or urea in the exhaust flow path 120 which may cause $NH_3$ slip if an engine start occurs before the system reaches equilibrium.

Module 430 is an injector command module structured to provide a $NO_x$ reductant injection signal 435 in response to the first amount of $NH_3$ pre-load 450. The injector command module 430 may also be structured to provide a $NO_x$ reductant injection signal 435 in response to the engine being shut down 405 or in response to an engine eminent shutdown 405*a* condition. In one embodiment, an engine shutdown is imminent (e.g., without limitation, the keyswitch is off and the engine speed is falling) and injector command module 430 responds by injecting at least part of the amount of $NH_3$ 421 or urea into the exhaust stream before the engine shutdown is completed (e.g. while the engine control module still has power during the power down sequence after the keyswitch is off). This embodiment may also further include injecting the amount of $NH_3$ 421 or urea into the exhaust stream over a period of time.

The injector command module 430 may be further structured to provide a $NO_x$ reductant injection signal 435 such that an $NH_3$ concentration value 442 in the exhaust stream does not exceed $NH_3$ threshold 444—for example by injecting small portions of the amount of $NH_3$ 421 over an extended period such that the $NH_3$ concentration value 442 is never higher than the $NH_3$ threshold 444. The operations of the injector command module 430 may be coordinated by the $NH_3$ scheduling module 440. The $NH_3$ scheduling module 440 is structured to determine a current $NH_3$ concentration 442. $NH_3$ scheduling module 440 is structured to monitor a current $NH_3$ concentration 442 in relation to the $NH_3$ threshold 444. The $NH_3$ threshold 444 may be an emissions limit 446 or an amicability limit 448. In one embodiment, $NH_3$ threshold 444 may be determined based on an emission limit 446 to reduce the release of excess $NH_3$ to the environment. When excess $NH_3$ slips through the SCR catalyst without reacting with the $NO_x$ emissions and is exhausted by the system, the condition is called $NH_3$ slip. The $NH_3$ slip limit may be determined by regulatory limits, amicability limits, or by other concerns understood in the art.

The schematic flow diagram and related description which follows provides an illustrative embodiment of performing procedures for enhancing exhaust aftertreatment startup emissions control. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

Figure 3:
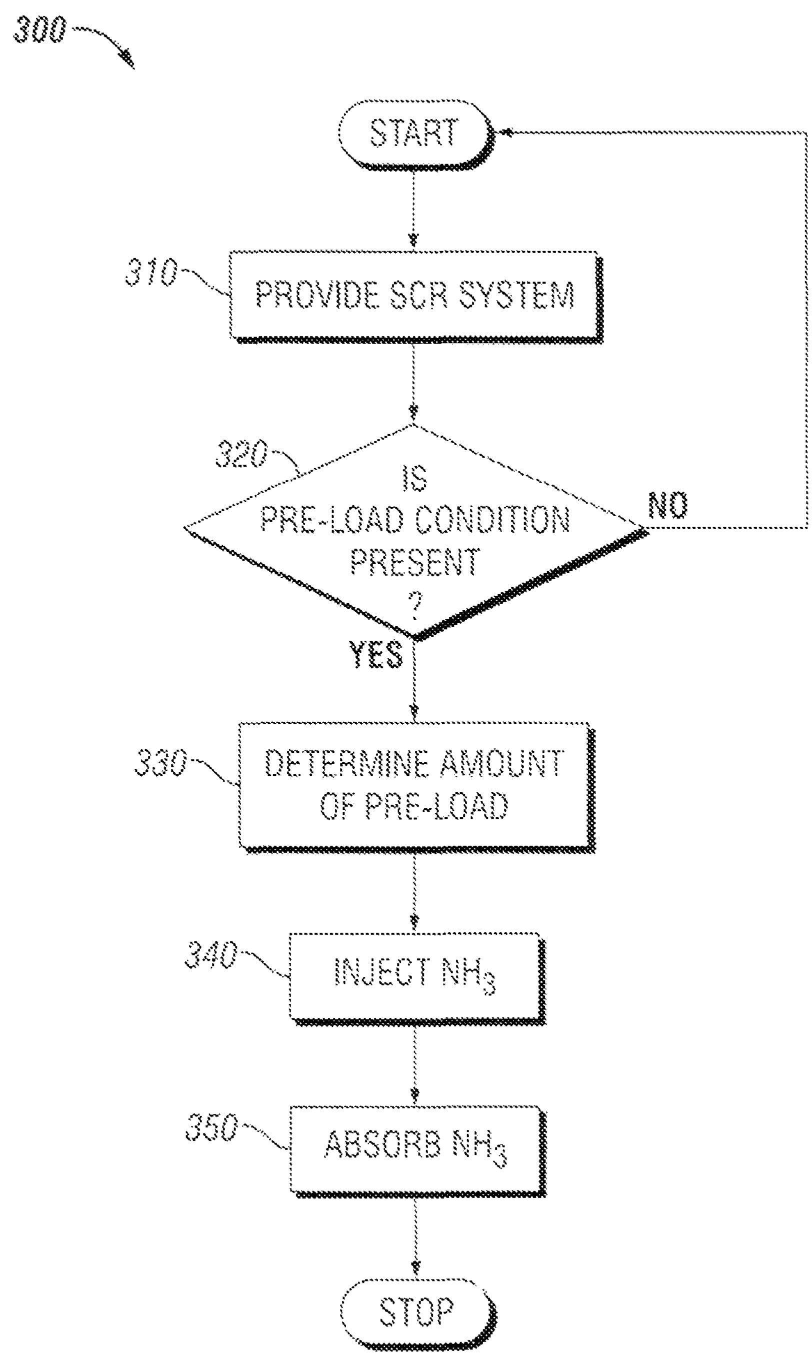
FIG. 3 is a flow diagram of a procedure for enhancing exhaust aftertreatment startup emissions control.

Referencing FIG. 3, a process 300 includes operation 310 to provide a selective catalytic reduction (SCR) system as part of an exhaust stream of an engine. The procedure 300 further includes conditional 320 to determine if an $NH_3$ pre-load condition for the SCR catalyst is present. The $NH_3$ pre-load conditions include conditions of the system that indicate circumstances for pre-loading the SCR catalyst with reductant to accommodate a potential for a higher level of ability to convert $NO_x$ produced during certain engine operations. In one embodiment, the engine operation includes an engine shutdown and then a cold restart. The potential for a higher level of ability to convert $NO_x$ can be achieved by pre-loading the SCR catalyst with a reductant such as $NH_3$. In addition, the temperature may affect the pre-load capabilities such as the ability for urea to hydrolyze, the amount of $NO_x$ that may be produced during a system warm up, and the ability to store $NH_3$ in the SCR catalyst in preparation for a higher level of ability to process exhaust gases based on the amount of $NH_3$ already stored and the temperature.

In various embodiments, the conditional 320 includes one or more of the following operations: determining that an ambient temperature is above a urea hydrolysis threshold; determining that an ambient temperature is below a cold start threshold; determining that an $NH_3$ storage amount on the SCR catalyst is below a storage needed threshold; or determining that a current SCR temperature is within an $NH_3$ storage temperature range. Temperature can be a factor in the various chemical reactions of these processes including the ability of the catalyst to either store or maintain an acceptable level of $NH_3$ and the rate at which injected urea hydrolyzes and $NH_3$ adsorbs onto the SCR catalyst. The amount of $NH_3$ stored in an SCR catalyst correlates to the amount of $NO_x$ that can be readily converted. To handle an engine operation causing a higher level of $NO_x$ at a time when rapid urea hydrolysis is not possible, an SCR catalyst with a corresponding higher level of $NH_3$ is able to convert a greater portion of the $NO_x$. Ensuring a predefined level of $NH_3$ is available on the catalyst may aid in reducing the amount of unconverted $NO_x$ leaving the emissions system.

The urea hydrolysis threshold may be a temperature value that is at least 20° C. or at least 0° C. The urea hydrolysis threshold temperature may also be a temperature selected such that a sufficient amount of $NH_3$ hydrolyzes from the injected amount of urea before the temperature of the exhaust pipe falls below 20° C. As the temperature of a system drops following an engine operation such as a shutdown, the ability of the urea to hydrolyze may be reduced below a predetermined threshold. Determining the operating conditions under which the system has the ability to utilize urea for $NO_x$ conversion should include selecting a temperature that maintains adequate hydrolysis. In one embodiment, the urea should be injected to allow hydrolysis before the temperature of the system falls to a level where hydrolysis will not be adequate to produce sufficient $NH_3$ for pre-loading an SCR catalyst. In an alternative, the urea hydrolysis threshold temperature may be a temperature selected such that a sufficient amount of $NH_3$ hydrolyzes from the injected amount of urea before the temperature of the exhaust pipe falls below a hydrolysis temperature limit.

A cold start condition where the engine has ceased operation and has cooled below normal operating temperatures may create a situation upon restart where a level of $NO_x$ produced by the 'cold' engine is emitted because the temperature of the aftertreatment system is below a temperature necessary for $NH_3$ production. To limit the amount of $NO_x$ emitted during cold starts, a cold start threshold may trigger a pre-load condition allowing an increased level of $NH_3$ for $NO_x$ conversion as an engine goes through a cold start. The colder an engine gets, the longer the engine takes to warm up to reach a urea hydrolysis temperature threshold. The longer the engine takes to warm up the more opportunity for $NO_x$ to pass through the emission system unconverted. A pre-loaded catalyst may contain sufficient $NH_3$ to convert a higher level of the $NO_x$. The cold start threshold may be 35° C. or a temperature selected such that, if the engine is cold soaked to the selected cold start threshold, a related threshold amount of $NO_x$ may be emitted by the engine during a subsequent engine start before a urea hydrolysis temperature is reached in the exhaust stream.

If conditional 320 in FIG. 3 returns a positive response, the procedure 300 continues with operation 330 to determine a first amount of $NH_3$ pre-load in response to the $NH_3$ pre-load condition. The operation 330 includes one or more of the following determinations: (1) determining a current available storage capacity of the SCR catalyst at a current SCR catalyst temperature, and determining the first amount of $NH_3$ pre-load in response to determining a fraction of the first amount of $NH_3$ pre-load that will be adsorbed onto the SCR catalyst; (2) modeling a final temperature of the SCR catalyst that will be present after the injected urea hydrolyzes into $NH_3$ then determining a final available storage capacity of the SCR catalyst that will be available at the final temperature of the SCR catalyst; (3) determining an amount of $NH_3$ selected such that if the engine is cold soaked to a current ambient temperature, enough $NO_x$ will be converted by the amount of $NH_3$ during a subsequent engine start that a threshold amount of $NO_x$ will not be emitted downstream of the SCR catalyst during a subsequent engine start before a urea hydrolysis temperature will be reached in the exhaust stream; or (4) determining an amount of $NH_3$ such that if the engine is cold soaked to a current ambient temperature, enough $NO_x$ will be converted by a total amount of $NH_3$ stored on the SCR catalyst (including initially stored $NH_3$ plus the first amount of $NH_3$ pre-load) during a subsequent engine start that a threshold amount of $NO_x$ will not be emitted downstream of the SCR catalyst before a urea hydrolysis temperature is reached in the exhaust stream. By limiting the amount of $NO_x$ emitted during an engine start up, the over all emissions will be reduced. Pre-loading the catalyst with $NH_3$ allows for the conversion of a related amount of $NO_x$ by reducing the amount of $NO_x$ emitted during start up and before the exhaust system reaches a temperature that again promotes the reactions necessary to convert $NO_x$. By limiting this initial $NO_x$ emission, the impact to the system of initial emissions on a cold start is reduced.

The procedure 300 further includes operation 340 to inject an amount of $NH_3$ or urea into the exhaust stream in response to the first amount of $NH_3$ pre-load. In one embodiment, the injected amount of $NH_3$ may be substantially all the $NH_3$ necessary to satisfy the pre-load amount determination. In another embodiment, the injected amount may consist of a partial amount of $NH_3$ pre-load followed by a return to operation 330 to determine a second amount of $NH_3$ pre-load based on a subsequent set of conditions and another partial amount of $NH_3$ pre-load injected during a subsequent injection under operation 340. Amounts of $NH_3$ pre-load are determined based on predicted performance considered during operation 330. In situations where an amount of $NH_3$ pre-load is determined and injected based on predicted conditions such as a cold soak, there is a potential for excess $NH_3$ when the engine is restarted before the predicted condition is reached which may cause $NH_3$ slip. By injecting a partial amount of $NH_3$ and returning to operation 330, incremental amounts of $NH_3$ are injected as time progresses rather than a single injection of the initially determined pre-load amount. Incremental injections of NH3 reduce the degree of prediction necessary and provide for a more accurate pre-load achievement.

Operation 340 may include injecting an amount of $NH_3$ or urea after the engine is shut down. Operation 340 is shown to be followed by operation 350 where a second amount of $NH_3$ is adsorbed onto the SCR catalyst in response to the injecting. The second amount of $NH_3$ can be the injected amount of $NH_3$, an amount of $NH_3$ resulting from hydrolysis from the injected amount of urea or a combination of the two.

As is evident from the figures and text presented above, a variety of embodiments according to the present invention are contemplated.

One embodiment is a method including: (1) providing a selective catalytic reduction (SCR) catalyst disposed in an exhaust stream of an engine; (2) determining that an $NH_3$ pre-load condition for the SCR catalyst is present; (3) determining a first amount of $NH_3$ pre-load in response to the $NH_3$ pre-load condition; (4) injecting an amount of $NH_3$ or urea into the exhaust stream in response to the first amount of $NH_3$; and (5) adsorbing a second amount of $NH_3$ onto the SCR catalyst in response to the injecting. The second amount of $NH_3$ can be the injected amount of $NH_3$, an amount of $NH_3$ resulting from hydrolysis from the injected amount of urea or a combination.

Other features of this embodiment may include injecting an amount of $NH_3$ or urea after the engine is shut down. Further, determining that an $NH_3$ pre-load condition for the SCR catalyst is present includes at least one of the following operations: determining that an ambient temperature is above a urea hydrolysis threshold; determining that an ambient temperature is below a cold start threshold; determining that an $NH_3$ storage amount on the SCR catalyst is below a storage needed threshold; or determining that a current SCR temperature is within an $NH_3$ storage temperature range.

Other features of this embodiment may include the urea hydrolysis threshold being a temperature value selected as being at least 20° C. or at least 0° C. The urea hydrolysis threshold temperature may also be such that a sufficient amount of $NH_3$ hydrolyzes from the injected amount of urea before a temperature of the exhaust pipe falls below 20° C. In an alternative, the urea hydrolysis threshold temperature may be such that a sufficient amount of $NH_3$ hydrolyzes from the injected amount of urea before a temperature of the exhaust pipe falls below a hydrolysis temperature limit.

Further features of this embodiment may include the cold start threshold being a temperature value selected as being 35° C. or a temperature selected such that, if the engine is cold soaked to the cold start threshold, a threshold amount of $NO_x$ will be emitted by the engine during a subsequent engine start before a urea hydrolysis temperature will be reached in the exhaust stream.

Another feature of this embodiment may include positioning the SCR catalyst in the exhaust stream at a vertically higher position than an injector that performs the injecting. Yet another feature of this embodiment may include positioning the injector downstream of the SCR catalyst.

A further feature of this embodiment may include determining the first amount of $NH_3$ pre-load by a quantifying operation selected from one of the following: (1) determining a current available storage capacity of the SCR catalyst at a current SCR catalyst temperature; (2) modeling a final temperature of the SCR catalyst that will be present after the injected urea hydrolyzes into $NH_3$ then determining a final available storage capacity of the SCR catalyst that will be available at the final temperature of the SCR catalyst; (3) determining an amount of $NH_3$ selected such that if the engine is cold soaked to a current ambient temperature, enough $NO_x$ will be converted by the amount of $NH_3$ during a subsequent engine start that a threshold amount of $NO_x$ will not be emitted downstream of the SCR catalyst during a subsequent engine start before a urea hydrolysis temperature will be reached in the exhaust stream; or (4) determining an amount of $NH_3$ selected such that if the engine is cold soaked to a current ambient temperature, enough $NO_x$ will be converted by a total amount of $NH_3$ stored on the SCR catalyst during a subsequent engine start that a threshold amount of $NO_x$ will not be emitted downstream of the SCR catalyst during a subsequent engine start before a urea hydrolysis temperature will be reached in the exhaust stream where the total amount of $NH_3$ includes the amount of $NH_3$ plus an initially stored amount of $NH_3$.

This embodiment may further include determining that an engine shutdown is imminent and injecting at least part of the $NH_3$ or urea into the exhaust stream before the engine shutdown is completed. This embodiment may also further include injecting the $NH_3$ or urea into the exhaust stream over a period of time such that an $NH_3$ concentration value in the exhaust stream does not exceed an $NH_3$ threshold. Still further, the $NH_3$ threshold may include an emissions limit or an amicability limit.

Another embodiment may include a system with an engine fluidly coupled to an exhaust stream; a selective catalytic reduction (SCR) catalyst disposed in the exhaust stream; a $NO_x$ reductant injector operationally coupled to the exhaust stream and fluidly coupled to one of an $NH_3$ source and a urea source; a temperature sensor structured to determine a temperature corresponding to an ambient air temperature; a temperature determiner, comprising one of a sensor and a model, structured to determine a temperature corresponding to an SCR catalyst temperature; and a controller. The controller is structured to determine that an $NH_3$ pre-load condition for the SCR catalyst is present; determine a first amount of $NH_3$ pre-load in response to the $NH_3$ pre-load condition; and command the injector to inject an amount of $NH_3$ or urea into the exhaust stream in response to the first amount of $NH_3$, such that the SCR catalyst adsorbs a second amount of $NH_3$ in response to the injecting, where the second amount of $NH_3$ is either the injected amount of $NH_3$ or an amount of $NH_3$ resulting from hydrolysis from the injected amount of urea.

Further features of this embodiment may include an SCR catalyst in the exhaust stream positioned at a vertically higher position than the injector and, in addition, an injector positioned downstream of the SCR catalyst.

Still another embodiment is an apparatus including an $NH_3$ pre-loading module structured to determine that an $NH_3$ pre-load condition for an SCR catalyst is present where the SCR catalyst is disposed in an exhaust stream of an engine; an $NH_3$ requirements module structured to determine a first amount of $NH_3$ pre-load in response to the $NH_3$ pre-load condition; an injector command module structured to provide a $NO_x$ reductant injection signal in response to the first amount of $NH_3$.

A further feature of this embodiment includes the injector command module being structured to provide a $NO_x$ reductant injection signal in response to the engine being shut down. Another feature may include the $NH_3$ pre-loading module being structured to determine that the $NH_3$ pre-load condition for the SCR catalyst is present by one of the following determinations: (1) determining that an ambient temperature is above a urea hydrolysis threshold; (2) determining that an ambient temperature is below a cold start threshold; (3) determining that an $NH_3$ storage amount on the SCR catalyst is below a storage needed threshold; or (4) determining that a current SCR temperature is within an $NH_3$ storage temperature range.

A further feature of this embodiment may include the $NH_3$ requirements module being further structured to determine a first amount of $NH_3$ pre-load by a quantifying operation selected from one of the following: (1) determining a current available storage capacity of the SCR catalyst at a current SCR catalyst temperature; (2) modeling a final temperature of the SCR catalyst that will be present after the injected urea hydrolyzes into $NH_3$ then determining a final available storage capacity of the SCR catalyst that will be available at the final temperature of the SCR catalyst; (3) determining an amount of $NH_3$ selected such that if the engine is cold soaked to a current ambient temperature, enough $NO_x$ will be converted by the amount of $NH_3$ during a subsequent engine start that a threshold amount of $NO_x$ will not be emitted downstream of the SCR catalyst during a subsequent engine start before a urea hydrolysis temperature will be reached in the exhaust stream; or (4) determining an amount of $NH_3$ selected such that if the engine is cold soaked to a current ambient temperature, enough $NO_x$ will be converted by a total amount of $NH_3$ stored on the SCR catalyst during a subsequent engine start that a threshold amount of $NO_x$ will not be emitted downstream of the SCR catalyst during a subsequent engine start before a urea hydrolysis temperature will be reached in the exhaust stream where the total amount of $NH_3$ includes the amount of $NH_3$ plus an initially stored amount of $NH_3$.

A further feature of this embodiment includes the $NH_3$ scheduling module which is structured to determine a current $NH_3$ concentration value and the injector command module which is further structured to provide the $NO_x$ reductant injection signal such that an $NH_3$ concentration value in the exhaust stream does not exceed an $NH_3$ threshold. Yet another feature includes the $NH_3$ threshold being an emissions limit or an amicability limit.

Certain exemplary embodiments are described following.

An exemplary set of embodiments is a method, including providing a selective catalytic reduction (SCR) catalyst disposed in an exhaust stream of an engine, determining that an ammonia ($NH_3$) pre-load condition for the SCR catalyst is present, and determining a first amount of $NH_3$ pre-load in response to the $NH_3$ pre-load condition. The method further includes injecting an amount of reductant into the exhaust stream in response to the first amount of $NH_3$ pre-load, where the injecting is performed after the engine is shut down. Exemplary embodiments of the method further include adsorbing a second amount of $NH_3$ onto the SCR catalyst in response to the injecting. The reductant may be $NH_3$, where the second amount of $NH_3$ comprises the injected amount of $NH_3$. The reductant may alternatively be urea, where the second amount of $NH_3$ includes an amount of $NH_3$ resulting from hydrolysis from the injected amount of urea.

Determining that the $NH_3$ pre-load condition for the SCR catalyst is present includes, in certain embodiments, determining that an ambient temperature is above a urea hydrolysis threshold. Exemplary urea hydrolysis threshold temperatures include at least 20° C., at least 0° C., a temperature selected such that a sufficient amount of $NH_3$ hydrolyzes from the injected amount of urea before a temperature of the exhaust pipe falls below 20° C., and/or a temperature selected such that a sufficient amount of $NH_3$ hydrolyzes from the injected amount of urea before a temperature of the exhaust pipe falls below a hydrolysis temperature limit. The temperature such that a sufficient of amount of $NH_3$ hydrolyzes from the injected amount of urea may be determined from the acceptable amount of $NH_3$ that is to available for adsorption on the SCR catalyst, and/or from the acceptable amount of urea that remains in the exhaust conduit until a subsequent engine start or ambient warm-up.

Exemplary embodiments of the method further include determining that an $NH_3$ pre-load condition for the SCR catalyst is present by determining that an ambient temperature is below a cold start threshold. Exemplary cold start threshold values include 35° C., and/or a temperature selected such that, if the engine is cold soaked to the cold start threshold, a threshold amount of $NO_x$ will be emitted by the engine during a subsequent engine start before a urea hydrolysis temperature will be reached in the exhaust stream. The threshold amount of $NO_x$ that can be emitted by the engine during a subsequent engine start may be selected according to acceptable emissions values or according to other considerations.

Another exemplary embodiment of the method includes determining that an $NH_3$ pre-load condition for the SCR catalyst is present by determining that an $NH_3$ storage amount on the SCR catalyst is below a storage needed threshold. Yet another exemplary embodiment of the method includes determining that the $NH_3$ pre-load condition for the SCR catalyst is present by determining that a current SCR temperature is within an $NH_3$ storage temperature range. Yet another exemplary embodiment of the method includes positioning the SCR catalyst in the exhaust stream at a vertically higher position than an injector that performs the injecting, and may further include positioning the injector downstream of the SCR catalyst. The injector positioned downstream of the SCR catalyst may be a second (or additional) reductant injector present in the system.

Yet another exemplary set of embodiments is a method, including operating an internal combustion engine, and treating an exhaust stream of the engine with a selective catalytic reduction (SCR) catalyst. The method further includes shutting down the engine, and in response to the shutting down the engine, determining that an ammonia ($NH_3$) pre-load condition for the SCR catalyst is present, determining a first amount of $NH_3$ pre-load in response to the $NH_3$ pre-load condition, and injecting an amount of urea into the exhaust stream in response to the first amount of $NH_3$ pre-load. Further embodiments include determining the first amount of $NH_3$ pre-load by determining a current available storage capacity of the SCR catalyst at a current SCR catalyst temperature; by modeling a final temperature of the SCR catalyst that will be present after the injected urea hydrolyzes into $NH_3$, and determining a final available storage capacity of the SCR catalyst that will be available at the final temperature of the SCR catalyst; by determining an amount of $NH_3$ selected such that if the engine is cold soaked to a current ambient temperature, enough $NO_x$ will be converted by the amount of $NH_3$ during a subsequent engine start that a threshold amount of $NO_x$ will not be emitted downstream of the SCR catalyst during a subsequent engine start before a urea hydrolysis temperature will be reached in the exhaust stream; and/or by determining an amount of $NH_3$ selected such that if the engine is cold soaked to a current ambient temperature, enough $NO_x$ will be converted by a total amount of $NH_3$ stored on the SCR catalyst during a subsequent engine start that a threshold amount of $NO_x$ will not be emitted downstream of the SCR catalyst during a subsequent engine start before a urea hydrolysis temperature will be reached in the exhaust stream, wherein the total amount of $NH_3$ comprises the amount of $NH_3$ plus an initially stored amount of $NH_3$.

Additional or alternative embodiments include determining that the shutting down the engine is imminent, and injecting at least part of the urea into the exhaust stream before the shutting down the engine is completed. Yet another exemplary embodiment includes injecting the urea into the exhaust stream over a period of time such that an $NH_3$ concentration value in the exhaust stream does not exceed an $NH_3$ threshold. A further embodiment includes determining the $NH_3$ threshold as one of an emissions limit and an amicability limit.

Yet another exemplary set of embodiments is a system, including an engine fluidly coupled to an exhaust stream, a selective catalytic reduction (SCR) catalyst disposed in the exhaust stream, and a $NO_x$ reductant injector operationally coupled to the exhaust stream and fluidly coupled to one of an ammonia ($NH_3$) source and a urea source. The system further includes a controller structured to interpret an SCR catalyst temperature and an ambient temperature, to determine that an $NH_3$ pre-load condition for the SCR catalyst is present in response to the ambient temperature, to determine a first amount of $NH_3$ pre-load in response to the $NH_3$ pre-load condition and the SCR catalyst temperature, and to command the injector to inject an amount of urea into the exhaust stream in response to the first amount of $NH_3$ pre-load.

In certain embodiments, the controller is further structured to determine that the $NH_3$ pre-load condition is present in response to determining that the ambient temperature is below a cold start threshold. Exemplary cold start threshold values include 35° C., and/or a temperature selected such that, if the engine is cold soaked to the cold start threshold, a threshold amount of $NO_x$ will be emitted by the engine during a subsequent engine start before a urea hydrolysis temperature will be reached in the exhaust stream.

In certain embodiments, the controller is further structured to determine that the $NH_3$ pre-load condition is present in response to determining that the ambient temperature is above a urea hydrolysis threshold. Exemplary urea hydrolysis threshold values include at least 20° C., at least 0° C., a temperature selected such that a sufficient amount of $NH_3$ hydrolyzes from the injected amount of urea before a temperature of the exhaust pipe falls below 20° C., and/or a temperature selected such that a sufficient amount of $NH_3$ hydrolyzes from the injected amount of urea before a temperature of the exhaust pipe falls below a hydrolysis temperature limit. The hydrolysis temperature limit may be a temperature selected such that the hydrolysis of urea progresses below a threshold rate at or below the hydrolysis temperature—for example where the amount of urea remaining in the exhaust will, on average, exceed an acceptable level at a subsequent engine start event that occurs at an average estimated later time.

An exemplary embodiment of the system includes the SCR catalyst in the exhaust stream positioned at a vertically higher position than the injector. A further exemplary embodiment includes the injector positioned downstream of the SCR catalyst.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:

an engine fluidly coupled to an exhaust stream;

a selective catalytic reduction (SCR) catalyst disposed in the exhaust stream;

a $NO_x$ reductant injector operationally coupled to the exhaust stream and fluidly coupled to one of an ammonia ($NH_3$) source and a urea source;

a controller operably connected to the $NO_x$ reductant injector and configured to:

interpret an SCR catalyst temperature and an ambient temperature;

determine that an $NH_3$ pre-load condition for the SCR catalyst is present in response to the ambient temperature;

determine a first amount of $NH_3$ pre-load in response to the $NH_3$ pre-load condition and the SCR catalyst temperature;

determine that the $NH_3$ pre-load condition is present in response to the ambient temperature being below a cold start threshold; and command the injector to inject an amount of urea into the exhaust stream in response to the first amount of $NH_3$ pre-load.

2. The system of claim 1, wherein the cold start threshold comprises a temperature value selected from the temperature values comprising:

35° C.; and a temperature selected such that, if the engine is cold soaked to the cold start threshold, a threshold amount of $NO_x$ will be emitted by the engine during a subsequent engine start before a urea hydrolysis temperature will be reached in the exhaust stream.

3. The system of claim 1, wherein the controller is further structured to determine that the $NH_3$ pre-load condition is present in response to the ambient temperature being above a urea hydrolysis threshold.

4. The system of claim 3, wherein the urea hydrolysis threshold comprises a temperature value selected from the temperature values comprising:

at least 20° C.;

at least 0° C.;

a temperature selected such that a sufficient amount of $NH_3$ hydrolyzes from the injected amount of urea before a temperature of an exhaust pipe falls below 20° C.; and a temperature selected such that a sufficient amount of $NH_3$ hydrolyzes from the injected amount of urea before a temperature of the exhaust pipe falls below a hydrolysis temperature limit.

5. The system of claim 1, wherein the SCR catalyst in the exhaust stream is positioned at a vertically higher position than the injector.

6. A system, comprising:

an engine fluidly coupled to an exhaust stream;

a selective catalytic reduction (SCR) catalyst disposed in the exhaust stream;

a $NO_x$ reductant injector operationally coupled to the exhaust stream and fluidly coupled to one of an ammonia ($NH_3$) source and a urea source, wherein the SCR catalyst in the exhaust stream is positioned at a vertically higher position than the injector and the injector is positioned downstream of the SCR catalyst;

a controller operably connected to the $NO_x$ reductant injector and configured to:

interpret an SCR catalyst temperature and an ambient temperature;

determine that an $NH_3$ pre-load condition for the SCR catalyst is present in response to the ambient temperature;

determine a first amount of $NH_3$ pre-load in response to the $NH_3$ pre-load condition and the SCR catalyst temperature; and command the injector to inject an amount of urea into the exhaust stream in response to the first amount of $NH_3$ pre-load.

7. An apparatus, comprising:

an electronic controller operably connected to a plurality of sensors associated with an exhaust aftertreatment system that receives an exhaust stream of an engine, the exhaust aftertreatment system including an SCR catalyst and a reductant injector, wherein the controller is operably connected to the reductant injector, the controller including:

an ammonia ($NH_3$) pre-loading module configured to determine that an $NH_3$ pre-load condition for the SCR catalyst is present;

an $NH_3$ requirements module configured to determine a first amount of $NH_3$ pre-load in response to the $NH_3$ pre-load condition;

an injector command module configured to provide a $NO_x$ reductant injection signal to the reductant injector to inject an amount of reductant into the exhaust stream in response to the first amount of $NH_3$ pre-load, wherein:

the $NH_3$ pre-loading module is further configured to determine that the $NH_3$ pre-load condition for the SCR catalyst in response to at least one of:

an ambient temperature being below a cold start threshold;

an $NH_3$ storage amount on the SCR catalyst being below a storage needed threshold; and a current SCR temperature being within an $NH_3$ storage temperature range.

8. The apparatus of claim 7, wherein the injector command module is further configured to provide a $NO_x$ reductant injection signal in response to the engine being shut down.

9. The apparatus of claim 7, wherein the $NH_3$ requirements module is further configured to determine the first amount of $NH_3$ pre-load by a quantifying operation selected from the quantifying operations consisting of:

determining a current available storage capacity of the SCR catalyst at a current SCR catalyst temperature;

modeling a final temperature of the SCR catalyst that will be present after an injected urea hydrolyzes into $NH_3$, and determining a final available storage capacity of the SCR catalyst that will be available at the final temperature of the SCR catalyst;

determining an amount of $NH_3$ selected such that if the engine is cold soaked to a current ambient temperature, enough $NO_x$ will be converted by the amount of $NH_3$ during a subsequent engine start that a threshold amount of $NO_x$ will not be emitted downstream of the SCR catalyst during a subsequent engine start before a urea hydrolysis temperature will be reached in the exhaust stream; and determining an amount of $NH_3$ selected such that if the engine is cold soaked to a current ambient temperature, enough $NO_x$ will be converted by a total amount of $NH_3$ stored on the SCR catalyst during a subsequent engine start that a threshold amount of $NO_x$ will not be emitted downstream of the SCR catalyst during a subsequent engine start before a urea hydrolysis temperature will be reached in the exhaust stream, wherein the total amount of $NH_3$ comprises the amount of $NH_3$ plus an initially stored amount of $NH_3$.

10. The apparatus of claim 7, wherein the controller further comprises an $NH_3$ scheduling module configured to determine a current $NH_3$ concentration value, and wherein the injector command module is further configured to provide the $NO_x$ reductant injection signal such that an $NH_3$ concentration value in the exhaust stream does not exceed an $NH_3$ threshold.

11. The apparatus of claim 10, wherein the $NH_3$ threshold comprises one of an emissions limit and an amicability limit.

12. The apparatus of claim 7, wherein the $NH_3$ pre-loading module is further configured to determine that the $NH_3$ pre-load condition for the SCR catalyst is present by determining that an ambient temperature is above a urea hydrolysis threshold.

13. A system, comprising:

an engine fluidly coupled to an exhaust stream;

a selective catalytic reduction (SCR) catalyst disposed in the exhaust stream;

a $NO_x$ reductant injector operationally coupled to the exhaust stream and fluidly coupled to one of an ammonia ($NH_3$) source and a urea source;

a controller operably connected to the $NO_x$ reductant injector and configured to:

interpret an SCR catalyst temperature and an ambient temperature;

determine that an $NH_3$ pre-load condition for the SCR catalyst is present in response to the ambient temperature and an $NH_3$ storage amount on the SCR catalyst being below a storage needed threshold;

determine a first amount of $NH_3$ pre-load in response to the $NH_3$ pre-load condition and the SCR catalyst temperature; and command the injector to inject an amount of urea into the exhaust stream in response to the first amount of $NH_3$ pre-load.

14. A system, comprising:

an engine fluidly coupled to an exhaust stream;

a selective catalytic reduction (SCR) catalyst disposed in the exhaust stream;

a $NO_x$ reductant injector operationally coupled to the exhaust stream and fluidly coupled to one of an ammonia ($NH_3$) source and a urea source;

a controller operably connected to the $NO_x$ reductant injector and configured to:

interpret an SCR catalyst temperature and an ambient temperature;

determine that an $NH_3$ pre-load condition for the SCR catalyst is present in response to the ambient temperature and a current SCR temperature being within an $NH_3$ storage temperature range;

determine a first amount of $NH_3$ pre-load in response to the $NH_3$ pre-load condition and the SCR catalyst temperature; and command the injector to inject an amount of urea into the exhaust stream in response to the first amount of $NH_3$ pre-load.

* * * * *